United States Patent
Miwa et al.

(10) Patent No.: US 9,358,751 B2
(45) Date of Patent: Jun. 7, 2016

(54) ACCESSORY MEMBER, AND ACCESSORY COMPRISING THE SAME

(75) Inventors: Ippei Miwa, Satsumasendai (JP); Muneki Koga, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 342 days.

(21) Appl. No.: 13/984,145

(22) PCT Filed: Feb. 7, 2012

(86) PCT No.: PCT/JP2012/052754
§ 371 (c)(1),
(2), (4) Date: Sep. 17, 2013

(87) PCT Pub. No.: WO2012/108433
PCT Pub. Date: Aug. 16, 2012

(65) Prior Publication Data
US 2014/0004302 A1    Jan. 2, 2014

(30) Foreign Application Priority Data
Feb. 7, 2011    (JP) .................................. 2011-024072

(51) Int. Cl.
*B32B 3/30*        (2006.01)
*H04R 25/00*       (2006.01)
*G04B 37/22*       (2006.01)

(52) U.S. Cl.
CPC ................ *B32B 3/30* (2013.01); *G04B 37/225* (2013.01); *H04R 25/658* (2013.01); *G04B 37/22* (2013.01); *Y10T 428/24355* (2015.01)

(58) Field of Classification Search
None
See application file for complete search history.

(56) References Cited

U.S. PATENT DOCUMENTS

| | | | |
|---|---|---|---|
| 6,548,162 B1 * | 4/2003 | Machida | C04B 41/009 4/222 |
| 6,574,343 B1 | 6/2003 | Meier | |
| 2003/0134107 A1 | 7/2003 | Machida et al. | |
| 2003/0142843 A1 | 7/2003 | Meier | |
| 2005/0257740 A1 | 11/2005 | Hoshino et al. | |

FOREIGN PATENT DOCUMENTS

| | | |
|---|---|---|
| CN | 1900021 A | 1/2007 |
| EP | 1090893 A1 | 4/2001 |
| EP | 2243756 A1 | 10/2010 |
| JP | 07191156 A | 7/1995 |

(Continued)

OTHER PUBLICATIONS

Chinese Office Action with English concise explanation, Chinese Patent Application No. 201280007726.7, Jun. 3, 2015, 6 pgs.

(Continued)

*Primary Examiner* — David Sample
*Assistant Examiner* — Donald M Flores, Jr.
(74) *Attorney, Agent, or Firm* — Volpe and Koenig, P.C.

(57) ABSTRACT

There are provided an accessory member capable of suppression of adhesion of dirt to its surface, and easy removal of adherent dirt, as well as to provide an accessory comprising the accessory member. An accessory member includes a sintered ceramic body, a kurtosis Rku derived from a surface roughness curve of an outer surface of the sintered ceramic body falling in a range of 0.5 or more and 2.5 or less. In this case, since the sintered ceramic body has many rounded asperities at its outer surface, it is possible to suppress adhesion of dirt to the outer surface, as well as to remove adherent dirt with ease.

7 Claims, 3 Drawing Sheets

(56) References Cited

FOREIGN PATENT DOCUMENTS

| | | |
|---|---|---|
| JP | 2002506335 A | 2/2002 |
| JP | 2004115332 A | 4/2004 |
| JP | 2008156160 A | 7/2008 |
| JP | 2010030833 A | 2/2010 |

OTHER PUBLICATIONS

International Search Report, PCT/JP2012/052754, Mar. 1, 2012, 2 pp.

Extended European Search Report, European Patent Application No. 12744634.2, Apr. 12, 2016, 7 pgs.

* cited by examiner

ACCESSORY MEMBER, AND ACCESSORY COMPRISING THE SAME

FIELD OF INVENTION

The present invention relates to an accessory member and an accessory comprising the accessory member.

BACKGROUND

Accessories, including an earphone, a headphone, a hearing aid, and a wristwatch that have been provided up to now vary widely in terms of material, color, and shape, depending on the intended use.

By way of example of accessory members used for accessories, in Patent Literature 1, there is disclosed a hearing aid comprising a cover member made of sintered polymer, polyethylene, spongy ceramic, spongy polyurethane, sintered glass, or sintered metal.

CITATION LIST

Patent Literature

Patent Literature 1: Japanese Unexamined Patent Application Publication JP-A 2002-506335

SUMMARY

Technical Problem

However, the hearing aid disclosed in Patent Literature 1 has the following drawbacks: where the cover member is made of spongy ceramic, it is prone to the buildup of dirt and skin oil, and cleaning such as wiping is difficult, in consequence whereof there results spoilage of the appearance of the hearing aid.

The invention has been devised in view of the problems as mentioned supra, and accordingly an object of the invention is to provide an accessory member capable of suppression of adhesion of dirt to its surface, and easy removal of adherent dirt, as well as to provide an accessory comprising the accessory member.

Solution to Problem

The invention provides an accessory member comprising a sintered ceramic body, a kurtosis Rku derived from a surface roughness curve of an outer surface of the sintered ceramic body falling in a range of 0.5 or more and 2.5 or less.

The invention provides an accessory comprising the accessory member mentioned above.

Advantageous Effects of Invention

According to the accessory member and the accessory pursuant to the invention, since the sintered ceramic body has many rounded asperities at its outer surface, it is possible to suppress adhesion of dirt to the outer surface, as well as to remove adherent dirt with ease.

DETAILED DESCRIPTION OF THE PREFERRED EMBODIMENTS

Hereinafter, the embodiments of the invention will be described with reference to drawings.

Figure 1:
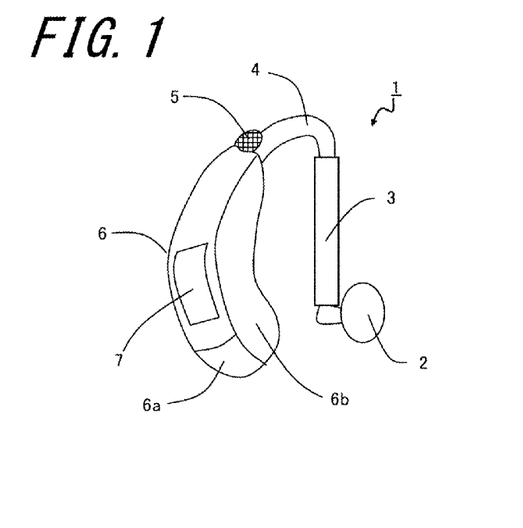
FIG. 1 is a perspective view of an ear-fit hearing aid which is an example of an accessory of the embodiment.

FIG. 1 is a perspective view of an ear-fit hearing aid 1 comprising a hearing-aid enclosure 6 (hereafter also referred to simply as "enclosure" for brevity) which is an example of an accessory of the embodiment. Although this embodiment will be described with respect to the case where the enclosure 6 is composed entirely of an accessory member of the embodiment, part of the enclosure 6 may be composed of the accessory member of the embodiment. The ear-fit hearing aid 1 comprises: an ear mold 2; a sound guide tube 3; a hook 4; a microphone 5; and the enclosure 6. Moreover, the enclosure 6 is provided with a hole 7 to allow at least part of an operation section for adjusting external sound-volume and sound-quality from outside to be exposed to the outside.

The enclosure 6 has, in its interior, a space for accommodating electronic components, including a control section for processing electric signals received by the operation section, a battery which serves as a power source, and electric circuitry formed of metal wires and so forth for transmission of signals received from the microphone 5 (this space will hereafter be also referred to simply as "interior space" for brevity). Moreover, the enclosure 6 is composed of a cover 6a and a housing 6b, so that, when it is desired to replace the electronic component accommodated in the interior space of the enclosure 6 such as the control section, the battery, or the electric circuitry, the replacement can be achieved simply by removing the cover 6a.

While the electronic component accommodated in the interior space of the enclosure 6 may be placed in the interior space without being secured to the inner surface of the enclosure constituting the inside of the enclosure, it is advisable to fasten the electronic component using a projection formed on the inner surface for engagement with the electronic component, as well as to fixedly mount the electronic component directly on the inner surface of the enclosure using an adhesive or the like. Moreover, while the microphone 5 is disposed outside of the enclosure as exemplified in FIG. 1, an auxiliary microphone may additionally be installed in the enclosure 6.

In order to prevent intrusion of water content such as sweat or rainwater into the interior space of the enclosure 6, the cover 6a and the housing 6b should preferably be tightly joined to each other so that no gap will be created between them, and also it is advisable to apply a coating of water-repellent resin on an as needed basis.

Such an ear-fit hearing aid 1 becomes operational by inserting the ear mold 2 into the external ear canal, and putting the hook 4 on the ear.

In this embodiment, the hearing-aid enclosure 6 is, at least partly, composed of the accessory member of the embodiment. In other words, the enclosure is, at least partly, made of a sintered ceramic body having a kurtosis (Rku) of 0.5 or more and 2.5 or less, the kurtosis being derived from a surface roughness curve of an outer surface of the sintered ceramic body.

In a case where the hearing-aid enclosure 6 is made of a sintered ceramic body, since the sintered ceramic body is, in contrast to ABS resin, metal, etc., hard in nature and is thus scratch-proof, and also has high Young's modulus, it is possible to increase the velocity of sound in the interior space of the enclosure 6, and thereby transmit tones in a high-tone range more delicately even if an auxiliary microphone is installed in the interior space of the enclosure 6. While various materials such for example as zirconia, alumina, silicon carbide, and silicon nitride and so forth can be used as the sintered ceramic body, it is desirable to use a material predominantly composed of zirconia because of its capability of strength enhancement and resistance to pore formation. As used herein, the term "predominantly composed of zirconia" means that the content of zirconia is greater than 50% by mass relative to the sintered ceramic body as a whole. Preferably, the content of zirconia is no less than 75% by mass, and more preferably the content of zirconia falls in a range of 86% by mass or more and 95% by mass or less. Note that yttria ($Y_2O_3$) may be added as a stabilizer for zirconia.

Also, where the hearing-aid enclosure 6 is made of a sintered ceramic body, since the sintered ceramic body is, in contrast to ABS resin, metal, etc., color-adjustable simply with admixture of a suitable additive acting as a colorant in raw materials without the necessity of performing coloring by means of plating or vapor deposition, it is less likely that a colored part prepared by plating or vapor deposition will be discolored or come unstuck, in consequence whereof there results no spoilage of the appearance. For example, with the addition of at least one of various oxides including nickel, cobalt, selenium, chromium, titanium, iron, and copper as an additive, a sintered ceramic body can be given various color hues, such as green, blue, yellow, red, and black, and also unique texture that cannot be achieved with coating application. It is preferable that the additives are totally contained in an amount of 3% by mass or more and 10% by mass or less.

In this embodiment, the term "accessory" is used to indicate articles that are brought into direct contact with human body, including those that are worn directly on human body (for example, earphones (including bone-conduction earphones), headphones, hearing aids, and wristwatches) and those that directly touch human body (for example, cellular phones and portable music reproduction apparatuses). In addition, the accessory member of the invention refers to a member constituting the aforementioned accessory (for example, a hearing aid enclosure, a wristwatch case, and a watch back cover).

Moreover, "outer surface of sintered ceramic body" is a collective term used to indicate a part that directly touches the skin of human body during wearing, a part that is touched by fingers, a surface that is directly put on human body for ornamental purposes, and so forth.

In the accessory member of the embodiment, it is important that the kurtosis (Rku) derived from the surface roughness curve of the outer surface of the sintered ceramic body falls in a range of 0.5 or more and 2.5 or less.

For example, where the value of kurtosis (Rku) derived from the surface roughness curve of the outer surface of the enclosure 6 of the hearing aid 1 shown in FIG. 1 falls in the range of 0.5 or more and 2.5 or less, the enclosure 6 has many rounded asperities at its outer surface, wherefore adhesion of dirt to the outer surface can be suppressed, and adherent dirt can be removed with ease. In order to suppress adhesion of dirt more effectively, the value of kurtosis (Rku) on the outer surface of the enclosure 6 should preferably fall in a range of 0.95 or more and 1.74 or less. It is advisable to measure the kurtosis (Rku) on the surface of the enclosure 6 in conformity with JIS B 0601-2001.

Moreover, it is preferable that a skewness (Rsk) derived from the surface roughness curve of the outer surface of the enclosure 6 falls in a range of 0.7 or more and 2.0 or less. Where the value of skewness (Rsk) derived from the surface roughness curve of the outer surface of the enclosure 6 falls in the range of 0.7 or more and 2.0 or less, the enclosure 6 has many protuberances at its outer surface, wherefore the amount of sweat and dirt that adhere to the surface of the enclosure 6 can be reduced, thereby relieving a feeling of discomfort. In order to achieve the relief of a feeling of discomfort caused by sweat, dirt, and so forth on the outer surface of the enclosure 6, the value of skewness (Rsk) on the surface of the enclosure 6 should preferably fall in a range of 0.98 or more and 1.32 or less. It is advisable to measure the skewness (Rsk) on the surface of the enclosure 6 in conformity with JIS B 0601-2001.

It is noted that the measurement of kurtosis (Rku) and skewness (Rsk) can be conducted by means of a commercially available contact-type or non-contact type surface roughness tester.

In the accessory member of the embodiment, it is preferable that the pore density of open pores at the outer surface of the sintered ceramic body is no more than 600 counts/mm$^2$. Where the pore density of open pores at the outer surface of the enclosure 6 is no more than 600 counts/mm$^2$, the number of open pores at the outer surface of the enclosure 6 is so small that adhesion of dirt to the outer surface can be suppressed, and adherent dirt can be removed with ease. In order to suppress adhesion of dirt more effectively, the pore density of open pores at the outer surface of the enclosure 6 should preferably be no more than 272 counts/mm$^2$. It is also preferable that the pore density of open pores at the inner surface of the enclosure 6 located toward the interior space is equivalent to the pore density of open pores at the outer surface.

Moreover, it is preferable that the pore density in the interior of the enclosure 6 is no more than 600 counts/mm$^2$. By adjusting the pore density in the interior of the enclosure 6 to be no more than 600 counts/mm$^2$, it is possible to suppress intrusion of external moisture into the enclosure 6, and thereby suppress breakage of electric circuitry and so forth housed in the enclosure 6. In order to suppress breakage of electric circuitry and so forth housed in the enclosure 6 caused by external moisture more effectively, the pore density in the interior of the enclosure 6 should preferably be no more than 272 counts/mm$^2$.

The pore density of open pores at each of the inner and outer surfaces of the enclosure 6 can be determined by taking images of arbitrarily selected five locations of each surface of the enclosure 6 by a field-emission type scanning electron microscope (FE-SEM) set at a magnification of 800 times, counting the number of open pores having a major diameter of no less than 1 μm in the range of each image which is 150 μm×111 μm in area, and calculating the mean value of all the count data.

The pore density of open pores in the interior of the enclosure 6 can be determined by cutting the enclosure 6 by a fine cutter, polishing the section of the enclosure 6 to a mirror-smooth state, taking images of arbitrarily selected five locations of the section of the enclosure 6 by a field-emission type scanning electron microscope (FE-SEM) set at a magnification of 800 times, counting the number of open pores having a major diameter of no less than 1 μm in the range of each image which is 150 μm×111 μm in area, and calculating the mean value of all the count data.

Moreover, it is preferable that the enclosure 6 of the embodiment has a thermal conductivity in a range of 1 W/(m·K) or more and 40 W/(m·K) or less. Where the thermal conductivity is no less than 1 W/(m·K), body temperature is transmitted from the skin to the enclosure during wearing, and heat is less likely to be confined in the enclosure 6, with consequent continuation of the coolness, and on the other hand, where the thermal conductivity is no more than 40 W/(m·K), even if the enclosure 6 of the embodiment is used in a place at low temperatures, it is possible to prevent condensation from forming on the surface of the enclosure 6.

Moreover, it is preferable that spinel is present at the outer surface of the enclosure 6 of the embodiment. In the presence of spinel, the enclosure can be rendered in vivid colors. Among spinel compounds, in the presence of $CoFe_2O_4$ or $FeCr_2O_4$ in particular, the enclosure 6 can be rendered in vivid black.

Moreover, in the enclosure 6 of the embodiment, it is preferable that the ratio of zirconia crystal structure to the sintered ceramic body as a whole is no more than 15% in terms of monoclinic crystal. Where the ratio of zirconia crystal structure to the sintered ceramic body is no more than 15% in terms of monoclinic crystal, even if the enclosure is subjected to heat repeatedly, the crystal structure transforms little from monoclinic crystal system to tetragonal crystal system, and therefore, since occurrence of damage due to volume changes resulting from transformation from monoclinic crystal system to tetragonal crystal system can be suppressed, the enclosure can be used without any problem even if it is sterilized in boiling water repeatedly. Accordingly, the service life of the product can be extended.

Moreover, as has already been described, the hearing-aid enclosure 6 shown in FIG. 1 has, in its interior, a space for accommodating electronic components including the control section and the battery. Note that the accessory may either be molded in one piece so that an interior space can be formed therein or be constructed by combining a plurality of members together so that an interior space can be formed therein. Where the enclosure 6 having an interior space is, at least partly, composed of the accessory member of the embodiment, it is preferable that the kurtosis (Rku) derived from the surface roughness curve of the inner surface of the accessory member located toward the interior space is greater than the kurtosis (Rku) derived from the surface roughness curve of the outer surface, and that the skewness (Rsk) derived from the surface roughness curve of the inner surface is smaller than the skewness (Rsk) derived from the surface roughness curve of the outer surface.

In this case, the inner surface tends toward having many valleys defining pits because of its smaller skewness, and also, due to its larger kurtosis, the valley is sharp-pointed. That is, in the inner surface, since the volume of the valleys defining pits is relatively large, and the pit is given sharp-pointed form (for example, sawtooth form), when an electronic component is mounted on the inner surface using an adhesive for example, the adhesive can be readily caught in the pits, in consequence whereof there results enhancement in the strength of adhesion between the electronic component and the sintered ceramic body.

Moreover, it is preferable that the skewness (Rsk) derived from the surface roughness curve of the inner surface falls in a range of −2.0 or more and −0.5 or less, and that the kurtosis (Rku) derived therefrom falls in a range of 4.0 or more and 6.0 or less. For example, where the skewness (Rsk) derived from the surface roughness curve of the inner surface of the enclosure 6 falls in the range of −2.0 or more and −0.5 or less, the valleys defining pits tend to increase, and also, since the kurtosis is large, it follows that the valley gets pointed sharper. Accordingly, an adhesive used to mount an electronic component directly on the inner surface can be caught in the pits more readily, in consequence whereof there results further enhancement in the strength of adhesion between the electronic component and the sintered ceramic body.

Moreover, in the ear-fit hearing aid 1, where a vibrator is incorporated into the electronic component to provide a vibratory function to produce vibration in response to communication transmitted by means of a bone-conduction speaker, radio, or otherwise, since the vibrator and the enclosure 6 can be joined to each other with excellent bondability, it is possible to achieve transmission of finer vibrational changes.

Figure 2:
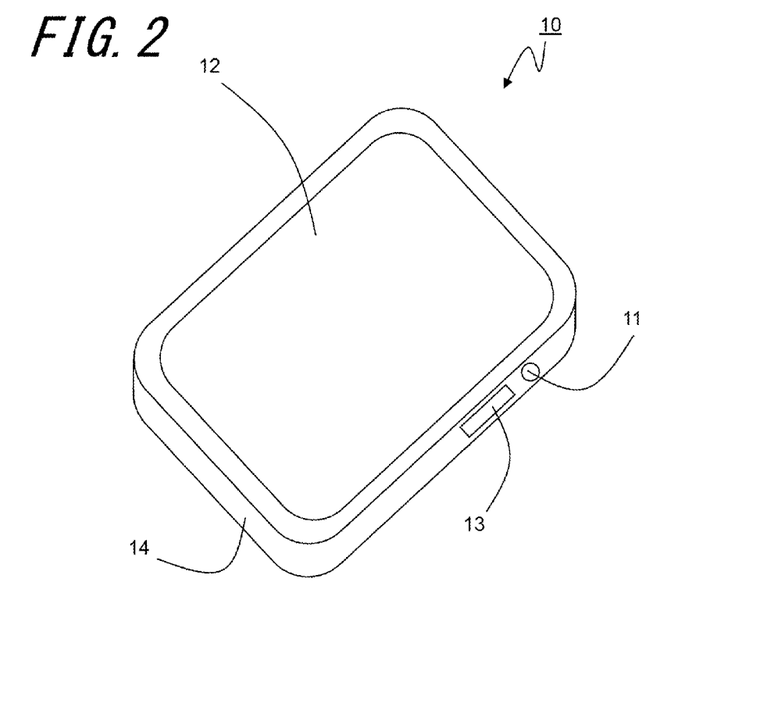
FIG. 2 is a perspective view of a portable music reproduction apparatus which is another example of the accessory of the embodiment.

FIG. 2 is a perspective view of a portable music reproduction apparatus 10 provided with a portable music reproduction apparatus case (hereafter also referred to simply as "case" for brevity) which is another example of the accessory of the embodiment. The portable music reproduction apparatus 10 comprises: a power switch 11; an operation section 12; a connection section 13; and a case 14. So long as, for example, the power switch 11 and a button of the operation section 12 (assuming that a push-button mode is adopted) are made of the sintered ceramic body of the embodiment, each of them corresponds to the accessory member of the embodiment.

The power switch 11 is intended to activate the portable music reproduction apparatus 10. The operation section 12 is a control panel to check running programs, and a mode of input may either be a push-button mode or a touch-panel mode. Moreover, inside the case 14 are disposed: a control section for processing electric signals received by the operation section 12; a battery which serves as a power source; and an electronic component such as a speaker which operates upon receipt of a signal processed in the control section, or a vibrator. Furthermore, the connection section 13 includes an earphone terminal, a microphone terminal, or a connection terminal for connection with other electronic component.

In the portable music reproduction apparatus 10 shown in FIG. 2, by forming the case 14 from the accessory member of the embodiment, even if the apparatus is used while being kept in contact with human body during physical activities such as jogging, it is possible to suppress adhesion of dirt such as sweat, as well as to remove adherent dirt with ease. Moreover, since the inner surface, on which is mounted an electronic component, is so configured that the volume of pit regions is large and the pit is sharp-pointed, it follows that the adhesive can be readily caught in the pits with consequent excellence in joinability between the mounted electronic component and the case 14, wherefore enhanced reliability can be ensured even under a vigorous workout, and also, with the provision of a vibrator, transmission of fine vibration can be achieved. Furthermore, where the portable music reproduction apparatus 10 is designed to serve also as a pulse rate meter or heart rate meter, by transmitting a pulse or heartbeat from human body received by the outer surface to a built-in vibrator, it is possible to achieve numerical data processing with higher accuracy.

Figure 3:
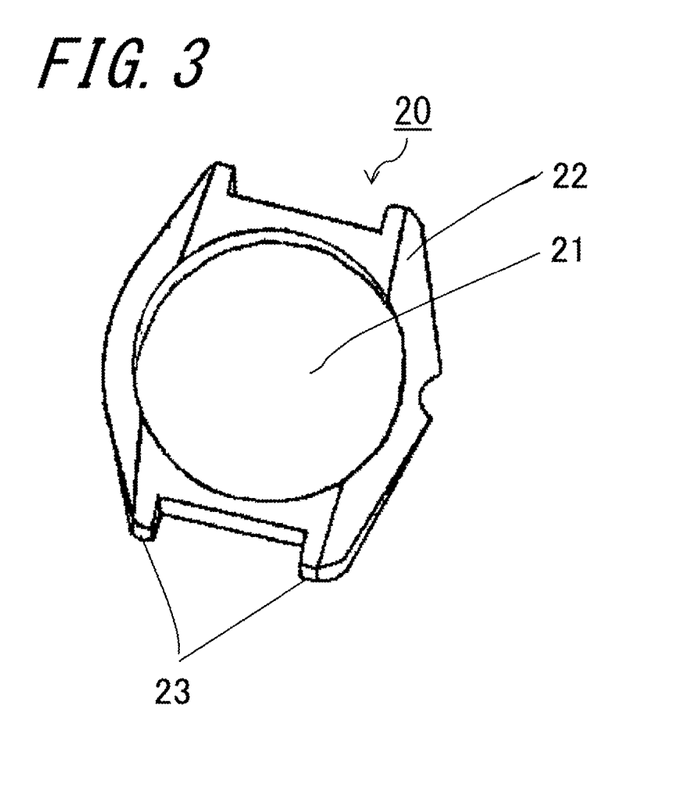
FIG. 3 is a perspective view of a wristwatch case which is an example of the accessory member used for the accessory of the embodiment.

FIG. 3 is a perspective view of a wristwatch case which is an example of the accessory member used for the accessory of the present embodiment.

The wristwatch case 20 shown in FIG. 3 comprises: a cavity portion 21 for receiving a non-illustrated movement (driving mechanism) and an electronic component; and extremity portions 23 for the securing of a wristwatch bracelet (not illustrated) formed in a body portion 22 for the wearing of a wristwatch.

The wristwatch case 20 can constitute an accessory component capable of suppression of adhesion of dirt to the surface and easy removal of adherent dirt so long as it is made of the accessory member of the embodiment.

Figure 4:
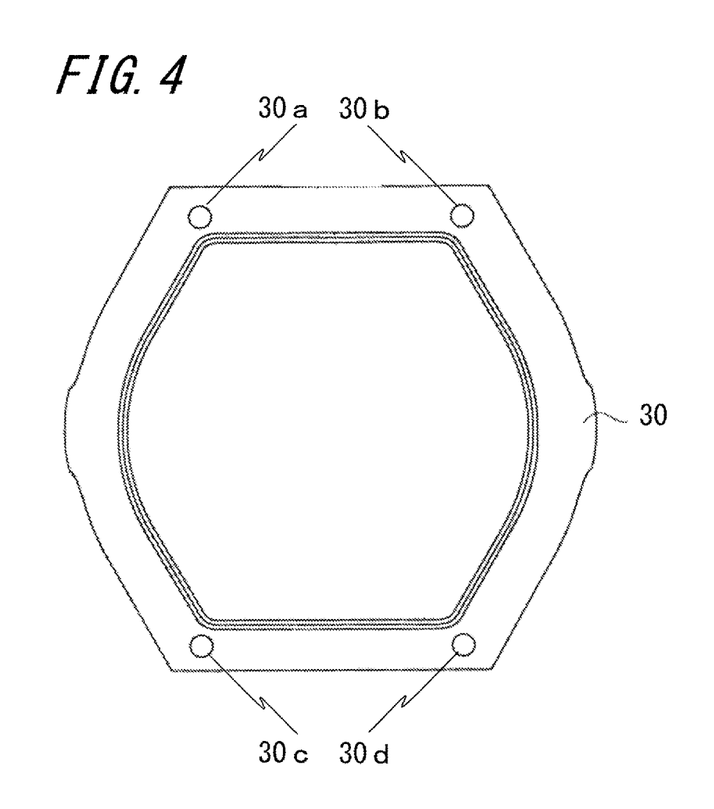
FIG. 4 is a plan view of a wristwatch back cover which is another example of the accessory member used for the accessory of the embodiment.

FIG. 4 is a plan view of a wristwatch back cover which is still another example of the accessory member used for the accessory of the embodiment.

The wristwatch back cover 30 shown in FIG. 4 can be attached to the back side of, for example, the wristwatch case 20 shown in FIG. 3 using screws (not illustrated) through a plurality of mounting holes 30a, 30b, 30c, and 30d formed at the periphery thereof.

The wristwatch back cover 30 can constitute an accessory capable of suppression of adhesion of dirt to the surface and easy removal of adherent dirt so long as it is made of the accessory member of the embodiment.

By utilizing the wristwatch case 20 and the wristwatch back cover 30 in combination, with a vibrator installed as an electronic component, it is possible to achieve transmission of fine vibration, and thereby afford an improved watch function.

While the already-given description deals with the case where the hearing-aid enclosure, the case for portable music reproduction apparatus, and the wristwatch case and the wristwatch back cover exemplify the accessory member of the embodiment and the accessory comprising the accessory member, the accessory member of the embodiment may be applicable to, for example, articles that are worn directly on human body such as earphones (including bone-conduction earphones), headphones, watch accessories such as watch bracelet segments, glasses or spectacles, brooches, necklaces, earrings, ornamental bracelets, anklets, tie holders, tie tacks, medals, and buttons, and also articles that directly touch human body such as cellular phones. The accessory member may also be applicable to a wristwatch-type cellular phone that combines the functions of a watch and a cellular phone into a single unit.

Hereinafter, an example of methods for producing the enclosure 6 will be described.

Pellets, which are used as an injection-molding raw material, are obtained by putting a plastic resin and a powdery raw material that is predominantly composed of zirconia and contains yttria (Y2O3) as a stabilizer in a kneader, kneading them under heat, and putting the resultant green body into a pelletizer. In the case of applying colors to the enclosure 6, it is advisable to add at least one of the following oxides: nickel; cobalt; selenium; chromium; titanium; iron; erbium; and copper as an additive. Moreover, as a thermoplastic resin to be put in the kneader, an ethylene-vinyl acetate copolymer, polystyrene, an acrylic resin, or the like can be used, and such a thermoplastic resin is advisably added in an amount of 10% by mass or more and 35% by mass or less with respect to 100% by mass of the powdery raw material. Furthermore, the kneading process using the kneader is advisably carried out at heating temperatures ranging from 140° C. or higher and 180° C. or lower, and, other conditions to be fulfilled in the kneading process such as a pressure level may be determined as appropriate with consideration given to the types of a ceramic raw material, a thermoplastic resin, and an additive for use.

Then, the thusly obtained pellets are put in an injection molding machine for injection molding, and, on an as needed basis, a runner with an excess of the raw material cooled into a solid state that adhered to the resultant molded body is cut, thereby producing a molded body for constituting an enclosure.

It is desirable to adopt injection molding technique rather than powder compression molding technique for the molding. The use of such a molding method makes it possible to eliminate a triple point arising from intimate contact of raw-material granules, and thereby render asperities even finer, with consequent easiness in control of the process to obtain desired surface shape.

Next, the thusly obtained molded body is subjected to degreasing treatment, and whereafter fired at a temperature of 1300° C. or higher and 1550° C. or lower under an air atmosphere in a batch furnace or a continuous tunnel furnace, thereby producing a sintered body.

There is a tendency that the higher the firing temperature is or the longer the firing time is, the smaller the pore density is.

Next, the thusly obtained sintered body is subjected to rough surface-finishing treatment using a barrel polishing machine, and subsequently the surface is polished to a mirror-smooth state by the barrel polishing machine, thereby producing the enclosure of the present embodiment. Note that, for example, blast finishing treatment may be used in conjunction with the aforementioned process as pretreatment.

In effecting the rough finishing treatment by the barrel polishing machine, with use of a heretofore known barreling apparatus, water, media, and the product are put in the apparatus in an about 1:1:1 ratio, and an adequate amount of abrasive grains is added. The media in use are about 5 to 10 mm in dimension, and the shape thereof can be selected from among spherical form, triangular prism form, rhombus form, cylindrical column form, oblique circular cylinder form, and so forth. Moreover, the abrasive grains in use may be of GC abrasive grains with a grit size of #150 to #800. The rough finishing treatment is carried out at 50 to 130 rpm for 20 to 50 hours by the barrel polishing machine, and subsequently, in effecting the mirror finishing treatment, with use of a heretofore known barrel polishing machine, water, media, and the product are put in the machine in an about 1:0.8:0.5 ratio, and an adequate amount of abrasive grains is added. The media in use are about 2 to 5 mm in dimension, and the shape thereof can be selected from among spherical form, triangular prism form, rhombus form, cylindrical column form, oblique circular cylinder form, and so forth, but, in particular, spherical form is desirable. This is because spherical media tend to make point-contact with the product, which helps facilitate skewness control. Moreover, the abrasive grains in use may be of GC abrasive grains with a grit size of #1000 to #8000. The mirror finishing treatment is carried out at 50 to 130 rpm for 20 to 80 hours by the barrel polishing machine. So long as the process is performed under conditions within the prescribed range, it is possible to exercise kurtosis-skewness control in a manner such that the kurtosis falls in a range of 0.5 or more and 2.5 or less, and the skewness falls in a range of 0.7 or more and 2.0 or less.

In the mirror finishing treatment, there is a tendency that the longer the barreling time is, the smaller the kurtosis is. Moreover, there is a tendency that the smaller the media size is or the finer the grit of the abrasive grains is, the larger the skewness is.

While the inner surface, on which is placed an electronic component, may be processed into a fired skin surface, it may be subjected to polishing or blast finishing treatment for adjustment of skewness and kurtosis.

Although skewness and kurtosis can be adjusted by the method as above described, in order for the outer surface and the inner surface to have different skewness-kurtosis tendencies, it is advisable to adopt the following additional method for more precise adjustment.

In the sintered ceramic body, now finished to a mirror-smooth state, in order to configure the outer surface so that it tends toward having many protuberances, most of which are rounded; that is, tends toward larger skewness and smaller kurtosis, it is advisable to carry out re-firing process at a temperature higher by 50 to 100° C. than the firing temperature. This helps expedite the formation of particle bumps in the sintered ceramic body, and also impart roundness to particle edges. At this time, in order to configure the inner surface so that it tends toward having many pits, it is advisable to prepare a jig to prevent direct transmission of heat to the inner surface, or to perform 0.5 to 1-hour firing on the sintered ceramic body lying face-down. In this way, the enclosure can be so designed that the value of kurtosis (Rku) derived from the surface roughness curve of the inner surface is greater than the value of kurtosis (Rku) derived from the surface roughness curve of the outer surface, and that the value of skewness (Rsk) derived from the surface roughness curve of the inner surface is smaller than the value of skewness (Rsk) derived from the surface roughness curve of the outer surface.

While practical examples of the invention will be particularized below, the invention is not to limited to these examples.

Example 1

In order to obtain samples, granules were formed by preparing 100% by mass of raw-material powder by mixing 94.8% by mass of zirconia (ZrO2) acting as raw-material powder and 5.2% by mass of yttrium oxide (Y2O3) acting as a stabilizer, adding, as a pigment additive, a mixture of chromium oxide, iron oxide, and cobalt oxide in a total amount of 4% by mass to 100% by mass of the raw-material powder, preparing a slurry by adding water to the admixture, with subsequent pulverization and mixing process being effected by a ball mill, and subjecting the slurry to spray-drying granulation process using a spray dryer.

Subsequently, pellets, which are used as an injection-molding raw material, were obtained by adding a mixture of an acrylic resin, polystyrene, an ethylene-vinyl acetate copolymer, stearic acid, and butyl phthalate (DBP) in a total amount of 25% by mass to 100% by mass of the granules, putting the admixture in a kneader, kneading them under heat at a temperature of 150° C., and putting the resultant green body into a pelletizer.

Then, a molded body for constituting a hearing-aid enclosure was formed by means of injection molding.

Next, the thusly obtained molded body was subjected to degreasing treatment, and has whereafter been fired at a firing temperature as listed in Table 1 under an air atmosphere for 2 hours in a batch furnace, whereby a sintered body of each sample was formed.

Next, the sintered body was subjected to rough surface-finishing treatment using a barrel polishing machine, and subsequently the surface was polished to a mirror-smooth state by the barrel polishing machine. Where barreling conditions are concerned, as has already been described, in effecting the rough finishing treatment, with use of a centrifugal barrel polishing machine (manufactured by TOHO KOKI Co., Ltd), water, media, and the product were put in the machine in an about 1:1:1 ratio, and an adequate amount of GC abrasive grains was added. As the media, spherical alumina media having an average particle size of 8 mm were used, and, as the abrasive grains, GC abrasive grains with a grit size of #150 were used, and the process was carried out at 75 rpm for 30 hours. After that, in effecting the mirror finishing treatment using the centrifugal barrel polishing machine, water, media, and the product were put in the machine in an about 1:0.8:0.5 ratio, and an adequate amount of GC abrasive grains was added. As the media, spherical alumina media having a particle size as listed in Table 1 were used, and, as the abrasive grains, GC abrasive grains with a grit size as listed in Table 1 were used, and the process was carried out at 90 rpm for a barreling time period as listed in Table 1. In conjunction with the firing temperatures, and the rough surface-finishing treatment and the mirror finishing treatment using the barrel polishing machine, there were fabricated samples of the hearing-aid enclosure that differ from one another in respect of pore density of open pores, kurtosis (Rku), and skewness (Rsk) as listed in Table 1.

Then, the pore density of open pores at the outer surface of each sample was determined by taking images of arbitrarily selected five locations of the surface of the hearing-aid enclosure by a field-emission type scanning electron microscope (FE-SEM) set at an 800-fold magnification, counting the number of open pores having a major diameter of no less than 1 µm in the range of each image which is 150 µm×111 µm in area, and calculating the mean value of all the count data. Note that, as the scanning electron microscope, SEM Type JSM-7001F manufactured by JEOL Ltd. was used, and acceleration voltage was set at 15 kV.

Moreover, the values of kurtosis (Rku) and skewness (Rsk) at the outer surface were measured in conformity with JIS B 0601-2001, with cutoff fl set at 8 and fh set at 0.8, measurement length set at 30 mm, measurement speed set at 0.5 mm/sec, longitudinal magnification set at 10000, and transverse magnification set at 2. Note that the measurement was conducted by Surface roughness measuring instrument ET 4000A manufactured by Kosaka Laboratory Ltd. based on non-contact type laser stylus method.

Hereinafter, methods for evaluation will be described.

Evaluation of the removal of adherent dirt (hereafter referred to "antifouling performance evaluation") was conducted by drawing a line which is 3 mm×10 mm in dimension on the surface of the hearing-aid enclosure by quick-dry oil-based ink (Mckee (trademark) manufactured by ZEBRA Co., Ltd., red color), and wiping the line off the surface by BEMCOT (trademark) manufactured by Asahi Kasei Corporation, and, judgment was based on the average of the number of times wiping was made to clean the line off (the number of decimal places were rounded off to the nearest integer) counted by monitoring groups consisting of people in their twenties, in their thirties, in their forties, and in their fifties, respectively, on a group-by-group basis (each group consisting of 5 men and 5 women), or a total of forty participants in all. Note that the presence or absence of line portions left unwiped on the surface of the hearing-aid enclosure was visually checked while tilting the surface at every angle relative to light radiated from a halogen lamp of 1000 W.

Another evaluation of the removal of adherent dirt (hereafter referred to "fingerprint removal performance evaluation") was conducted by pressing a forefinger against the surface of the hearing-aid enclosure for 5 to 10 seconds and wiping the fingerprint off the surface by BEMCOT (trademark) manufactured by Asahi Kasei Corporation, and, judgment was based on the average of the number of times wiping was made to clean the fingerprint off (the number of decimal places were rounded off to the nearest integer) counted by monitoring groups consisting of people in their twenties, in their thirties, in their forties, and in their fifties, respectively, on a group-by-group basis (each group consisting of 5 men and 5 women), or a total of forty participants in all. Note that the presence or absence of fingerprint portions left unwiped on the surface of the hearing-aid enclosure was visually checked while tilting the surface at every angle relative to light radiated from a halogen lamp of 1000 W.

Evaluation of the relief of a feeling of discomfort caused for example by perspiration (hereafter referred to "wearing comfortableness evaluation") was conducted through wearability monitoring tests. As a method for the evaluation, each sample was built as an ear-fit hearing aid, and, monitoring groups consisting of people in their twenties, in their thirties, in their forties, and in their fifties, respectively (each group consisting of 5 men and 5 women), or a total of forty participants in all, have lived their life as usual for 10 days while wearing the ear-fit hearing aid, and information about feeling-based wearing evaluation was obtained by means of questionnaires. In the Table, "Excellent" means that all of the forty participants did not suffer any wearing problem and did not have any unpleasant feeling during long-term wearing; "Good" means that 35 to 39 participants had the same result; "Acceptable" means that 30 to 34 participants had the same result; and "Unsatisfactory" means that less than 30 participants had the same result.

The results of measurement and feeling-based evaluation are listed in Table 1.

which the skewness (Rsk) of the outer surface of the hearing-aid enclosure falls in a range of 0.98 or more and 1.32 or less were rated as "Excellent" in respect of wearing comfortableness. Furthermore, in Sample Nos. 3 to 18 in which the pore density of open pores at the outer surface of the hearing-aid enclosure is no more than 600 counts/mm$^2$, the number of times wiping was made in the antifouling performance evaluation was no more than 9. Among them, in Sample Nos. 5 to 18 in particular, in which the pore density of open pores at the outer surface of the hearing-aid enclosure is no more than 272 counts/mm$^2$, the number of times wiping was made in the antifouling performance evaluation was no more than 4.

As described heretofore, in the hearing-aid enclosure of the embodiment, the value of kurtosis (Rku) derived from the surface roughness curve of the outer surface thereof falls in the range of 0.5 or more and 2.5 or less, wherefore adherent dirt can be removed with ease, and the value of skewness (Rsk) derived from the surface roughness curve of the outer surface falls in the range of 0.7 or more and 2.0 or less, wherefore the relief of a feeling of discomfort caused by perspiration and so forth on the surface can be achieved, and also, the pore density of open pores at each surface of the sintered ceramic body is no more than 600 counts/mm$^2$, wherefore adhesion of dirt to the surface can be suppressed.

TABLE 1

| | | | Mirror finish | | | | | Evaluation | | |
|---|---|---|---|---|---|---|---|---|---|---|
| | | | | Average | Outer surface | | | | | |
| Sample No. | Firing temperature (° C.) | Barreling time (hours) | Grit size of abrasive grains | particle size of media (mm) | Pore density of open pores (counts/mm$^2$) | Rku | Rsk | Antifouling performance evaluation | Fingerprint removal performance evaluation | Wearing comfortableness evaluation |
| 1 | 1280 | 19 | #1200 | 6 | 893 | 2.76 | 0.54 | 30 | 30 | Acceptable |
| 2 | 1290 | 19 | #1200 | 6 | 654 | 2.55 | 0.58 | 17 | 25 | Acceptable |
| 3 | 1300 | 19 | #1200 | 6 | 600 | 2.60 | 0.61 | 9 | 17 | Acceptable |
| 4 | 1420 | 19 | #1200 | 6 | 402 | 2.58 | 0.61 | 8 | 17 | Acceptable |
| 5 | 1480 | 19 | #1200 | 6 | 272 | 2.60 | 0.62 | 4 | 17 | Acceptable |
| 6 | 1520 | 19 | #1200 | 6 | 112 | 2.60 | 0.59 | 2 | 17 | Acceptable |
| 7 | 1550 | 19 | #1200 | 6 | 78 | 2.62 | 0.58 | 1 | 16 | Acceptable |
| 8 | 1480 | 20 | #1200 | 6 | 264 | 2.50 | 0.57 | 4 | 9 | Acceptable |
| 9 | 1480 | 25 | #1200 | 6 | 258 | 2.20 | 0.63 | 3 | 8 | Acceptable |
| 10 | 1480 | 45 | #1200 | 6 | 270 | 1.74 | 0.61 | 4 | 3 | Acceptable |
| 11 | 1480 | 60 | #1200 | 6 | 264 | 0.95 | 0.63 | 3 | 2 | Acceptable |
| 12 | 1480 | 80 | #1200 | 6 | 264 | 0.52 | 0.60 | 3 | 7 | Acceptable |
| 13 | 1480 | 85 | #1200 | 6 | 264 | 0.43 | 0.64 | 3 | 12 | Acceptable |
| 14 | 1480 | 55 | #1200 | 2 | 270 | 1.42 | 0.70 | 4 | 3 | Good |
| 15 | 1480 | 55 | #2000 | 2 | 264 | 1.44 | 0.98 | 3 | 3 | Excellent |
| 16 | 1480 | 55 | #4000 | 2 | 258 | 1.45 | 1.32 | 3 | 3 | Excellent |
| 17 | 1480 | 55 | #6000 | 2 | 258 | 1.39 | 2.00 | 3 | 3 | Good |
| 18 | 1480 | 55 | #8000 | 1 | 264 | 1.40 | 2.14 | 3 | 3 | Acceptable |

As is apparent from the results shown in Table 1, in Sample Nos. 8 to 12 and 14 to 18 in which the kurtosis (Rku) of the outer surface of the hearing-aid enclosure falls in a range of 0.50 or more and 2.5 or less, the number of times wiping was made in the fingerprint removal performance evaluation was no more than 9. Among them, in Sample Nos. 10 to 12 and 14 to 18 in particular, in which the kurtosis (Rku) of the outer surface of the hearing-aid enclosure falls in a range of 0.52 or more and 1.74 or less, the number of times wiping was made in the fingerprint removal performance evaluation was no more than 3. Moreover, Sample Nos. 14 to 17 in which the skewness (Rsk) of the outer surface of the hearing-aid enclosure falls in a range of 0.70 or more and 2.00 or less were rated as "Excellent" or "Good" in respect of wearing comfortableness. Among them, Sample Nos. 15 and 16 in particular, in Example 2

Next, evaluation of the reliability in adhesion between the electronic component and the sintered ceramic body was conducted with varying surface shapes of the inner surface.

After forming pellets used as an injection-molding raw material just as with Example 1, a plate-like molded body was formed by means of injection molding in a manner such that a resultant sintered body can be 30 mm long, 30 mm wide, and 1 mm thick. Then, a sintered ceramic body was produced, with a maximum firing temperature set at 1480° C., and with retention time set at 2 hours.

Next, the sintered ceramic body was subjected, at each surface, to rough-finishing treatment using a barrel polishing machine under the same conditions as those set for Example 1. Subsequently, the surfaces were polished to a mirror-smooth state by a centrifugal barrel polishing machine under conditions where: water, the product, and media are put in the machine in an about 1:0.8:0.5 ratio; spherical alumina media having a size as listed in Table 2 are used; GC abrasive grains with a grit size as listed in Table 2 are used; and the process is carried out at 90 rpm for a time period as listed in Table 2.

After that, the sintered ceramic body was re-fired at a firing temperature as listed in Table 2, with its one main surface lying face-up (outer surface) and the other main surface lying face-down (inner surface), while being retained for 0.5 hours. Note that Sample No. 19 was not re-fired.

In the manner as above described, Sample Nos. 19 to 26 were produced, and, the skewness (Rsk) and kurtosis (Rku) at the outer and inner surfaces of each sample were measured in the same method as that adopted in Example 1.

Moreover, drop tests were conducted to determine joinability to an electronic component. After applying epoxy resin, which is 15 mm in diameter and 0.5 mm in thickness, to the inner surface, an electronic component (bimorph-structure piezoelectric vibrator which is 15 mm in diameter and 2 mm in thickness) was bonded thereto, and then, after thorough drying process, the samples were subjected to a drop test. In the drop test, each sample in a horizontal position, with its electronic component-free side (outer surface) down, was caused to fall freely a distance of 300 mm on to ground up to 100 times to determine how many drops were counted until the electronic component and the sintered ceramic body separated from each other.

The results of measurement are listed in Table 2.

roughness curve of the inner surface falls in a range of −2.0 or more and −0.5 or less, and the kurtosis (Rku) falls in a range of 4.0 or more and 6.0 or less, the number of drops counted before occurrence of separation was no less than 85, and it has thus been found out that these samples exhibit excellent joinability, and, in addition, in Sample Nos. 22 and 23, in particular, in which the skewness (Rsk) derived from the surface roughness curve of the inner surface falls in a range of −1.32 or more and −0.98 or less, and the kurtosis (Rku) falls in a range of 4.23 or more and 5.13 or less, there was no sign of separation even after 100 drops, and it has thus been found out that these samples exhibit outstanding joinability.

Example 3

Next, the difference in surface condition among hearing-aid enclosures 6 predominantly composed of zirconia, alumina, silicon carbide, and silicon nitride, respectively, was checked after the wearing in 60-day daily life.

As the hearing-aid enclosure predominantly composed of zirconia, Sample No. 15 of Example 1 was used.

In order to form the hearing-aid enclosure predominantly composed of alumina, granules were obtained by mixing 96.0% by mass of alumina ($Al_2O_3$) as raw-material powder, and magnesium oxide, silicon oxide, and calcium oxide in a total amount of 4% by mass, preparing a slurry by adding water to the admixture, with subsequent pulverization and mixing process being effected by a ball mill, and subjecting the slurry to spray-drying granulation process using a spray dryer.

TABLE 2

| | | | Mirror finish | | | | | | |
|---|---|---|---|---|---|---|---|---|---|
| Sample No. | Barreling time (hours) | Grit size of abrasive grains | Average particle size of media (mm) | Re-firing temperature (° C.) | Outer surface Rku | Outer surface Rsk | Inner surface Rku | Inner surface Rsk | Drop test Number of drops counted before separation |
| 19 | 40 | #6000 | 2 | — | 1.80 | 1.44 | 1.80 | 1.44 | 40 |
| 20 | 10 | #1200 | 2 | 1590 | 1.78 | 1.41 | 6.21 | −2.10 | 79 |
| 21 | 10.5 | #1500 | 2 | 1580 | 1.76 | 1.40 | 6.00 | −2.00 | 85 |
| 22 | 12 | #2000 | 2 | 1560 | 1.70 | 1.37 | 5.13 | −1.32 | No separation |
| 23 | 14 | #2500 | 2 | 1550 | 1.65 | 1.34 | 4.23 | −0.98 | No separation |
| 24 | 16 | #3000 | 2 | 1530 | 1.63 | 1.27 | 4.00 | −0.50 | 92 |
| 25 | 18 | #4000 | 1 | 1520 | 1.59 | 1.25 | 3.76 | 0.53 | 88 |

As shown in Table 2, in Sample No. 19 in which the kurtosis (Rku) derived from the surface roughness curve of the inner surface is equal to the kurtosis (Rku) derived from the surface roughness curve of the outer surface, and the skewness (Rsk) derived from the surface roughness curve of the inner surface is equal to the skewness (Rsk) derived from the surface roughness curve of the outer surface as well, the number of drops counted before occurrence of separation was as small as 40. On the other hand, in Sample Nos. 20 to 25 in which the kurtosis (Rku) derived from the surface roughness curve of the inner surface is larger than the kurtosis (Rku) derived from the surface roughness curve of the outer surface, and the skewness (Rsk) derived from the surface roughness curve of the inner surface is smaller than the skewness (Rsk) derived from the surface roughness curve of the outer surface, the number of drops counted before occurrence of separation was no less than 79, and it has thus been found out that these samples exhibit good joinability. Moreover, in Sample Nos. 21 to 24 in which the skewness (Rsk) derived from the surface In order to form the hearing-aid enclosure predominantly composed of silicon carbide, granules were obtained by mixing 95.5% by mass of a-silicon carbide (α-SiC) as raw-material powder, 3.5% by mass of alumina ($Al_2O_3$), and 1.0% by mass of yttrium oxide ($Y_2O_3$), preparing a slurry by adding a solvent to the admixture, with subsequent pulverization and mixing process being effected by a ball mill, and subjecting the slurry to spray-drying granulation process using a spray dryer.

In order to form the hearing-aid enclosure predominantly composed of silicon nitride, granules were obtained by adding, to 100% by mass of silicon nitride ($Si_3N_4$) as raw-material powder, calcium oxide, aluminum oxide, and an oxide of rare-earth element acting as sintering aids in a total amount of 5% by mass, preparing a slurry by adding a solvent to the admixture, with subsequent pulverization and mixing process being effected by a ball mill, and subjecting the slurry to spray-drying granulation process using a spray dryer.

Subsequently, pellets, which are used as an injection-molding raw material, were obtained by adding a mixture of an acrylic resin, polystyrene, an ethylene-vinyl acetate copolymer, stearic acid, and dibutyl phthalate (DBP) in a total amount of 25% by mass to 100% by mass of each of the granular materials, putting the admixture in a kneader, kneading them under heat at a temperature of 150° C., and putting the resultant green body into a pelletizer.

Then, molded bodies for constituting the hearing-aid enclosures were formed by means of injection molding.

Next, the thusly obtained molded bodies were subjected to degreasing treatment, and, in a batch furnace, the alumina-based molded body was fired at 1600° C. under an air atmosphere, the silicon carbide-based molded body was fired at 2000° C. under an argon-gas atmosphere, and the silicon nitride-based molded body was fired at 1780° C. under a nitrogen-gas atmosphere, whereby sintered bodies of individual samples were formed.

Next, the sintered bodies were processed within the range of the same barreling conditions as those set for Sample No. 15 of Example 1 in a manner such that the outer surface is identical with that of Sample No. 15 in respect of the pore density of open pores, the value of kurtosis (Rku), and the value of skewness (Rsk).

In the hearing-aid enclosures predominantly composed of alumina, silicon carbide, and silicon nitride, respectively, many flaws, which were probably made by wiping of dirt or on contact, were found through a visual check, but, in Sample No. 15 predominantly composed of zirconia according to the embodiment, occurrence of a flaw was not identified through a visual check.

It has thus been confirmed that the hearing-aid enclosure predominantly composed of zirconia suffers little from a surface flaw, and exhibits high strength.

REFERENCE SIGNS LIST

1: Ear-fit hearing aid
2: Ear mold
3: Sound guide tube
4: Hook
5: Microphone
6: Enclosure
6a: Cover
6b: Housing
7: Operation section
10: Portable music reproduction apparatus
11: Power switch
12: Operation section
13: Connection section
14: Case
20: Wristwatch case
30: Wristwatch back cover

What is claimed is:

1. An accessory member, comprising:
a sintered ceramic body, a kurtosis (Rku) derived from a surface roughness curve of an outer surface of the sintered ceramic body falling in a range of 0.5 or more and 2.5 or less,
wherein a skewness (Rsk) derived from the surface roughness curve of the outer surface of the sintered ceramic body falls in a range of 0.7 or more and 2.0 or less.

2. The accessory member according to claim 1, wherein the sintered ceramic body is predominantly composed of zirconia.

3. An accessory member, comprising:
a sintered ceramic body, a kurtosis (Rku) derived from a surface roughness curve of an outer surface of the sintered ceramic body falling in a range of 0.5 or more and 2.5 or less,
wherein a pore density of open pores at the outer surface of the sintered ceramic body is no more than 600 counts/mm$^2$.

4. The accessory member according to claim 3,
wherein the sintered ceramic body is predominantly composed of zirconia.

5. An accessory, comprising:
an accessory member including
a sintered ceramic body, a kurtosis (Rku) derived from a surface roughness curve of an outer surface of the sintered ceramic body falling in a range of 0.5 or more or 2.5 or less,
wherein a skewness (Rsk) derived from the surface roughness curve of the outer surface of the sintered ceramic body falls in a range of 0.7 or more and 2.0 or less.

6. The accessory according to claim 5,
wherein the accessory has a space in its interior,
wherein the accessory is, at least partly, composed of the accessory member,
and wherein a kurtosis (Rku) derived from a surface roughness curve of an inner surface of the ceramic sintered body constituting the accessory member is greater than the kurtosis (Rku) derived from the surface roughness curve of the outer surface of the sintered ceramic body, and a skewness (Rsk) derived from the surface roughness curve of the inner surface of the ceramic sintered body constituting the accessory member is smaller than the skewness (Rsk) derived from the surface roughness curve of the outer surface of the sintered ceramic body.

7. The accessory according to claim 6,
wherein the skewness (Rsk) derived from the surface roughness curve of the inner surface of the ceramic sintered body constituting the accessory member falls in a range of −2.0 or more and −0.5 or less, and the kurtosis (Rku) derived from the surface roughness curve of the inner surface of the ceramic sintered body constituting the accessory member falls in a range of 4.0 or more and 6.0 or less.

* * * * *